US 007124680B2

(12) United States Patent
Poss et al.

(10) Patent No.: US 7,124,680 B2
(45) Date of Patent: Oct. 24, 2006

(54) SOLAR POWERED COMPACTION APPARATUS

(75) Inventors: James Poss, Somerville, MA (US); Jeffrey Satwicz, Auburndale, MA (US); Bret Richmond, Needham, MA (US); Mikell Taylor, Needham, MA (US)

(73) Assignee: Seahorse Power Company, Needham, MA (US)

( * ) Notice: Subject to any disclaimer, the term of this patent is extended or adjusted under 35 U.S.C. 154(b) by 0 days.

(21) Appl. No.: 10/864,566

(22) Filed: Jun. 9, 2004

(65) Prior Publication Data

US 2005/0005785 A1   Jan. 13, 2005

Related U.S. Application Data

(60) Provisional application No. 60/476,832, filed on Jun. 9, 2003.

(51) Int. Cl.
*B30B 9/30* (2006.01)
*B30B 15/14* (2006.01)

(52) U.S. Cl. .............. 100/229 A; 100/48; 100/99; 100/193; 100/221; 100/233; 100/237; 100/345

(58) Field of Classification Search .......... 100/49, 100/99, 214, 215, 102, 137, 193, 221, 229 A, 100/233, 237, 345, 48
See application file for complete search history.

(56) References Cited

U.S. PATENT DOCUMENTS

| 4,147,100 A | * | 4/1979 | Dykstra .................. 100/48 |
| 4,188,872 A | * | 2/1980 | Chrablow ................ 100/343 |
| 4,827,645 A | | 5/1989 | Stamps, Jr. ............... 40/567 |
| 5,222,853 A | | 6/1993 | Carson ................... 414/408 |
| 5,415,264 A | * | 5/1995 | Menoud .................. 194/217 |
| 5,690,025 A | | 11/1997 | Hawkins .................. 100/35 |
| 5,713,270 A | | 2/1998 | Fitzgerald et al. .......... 100/49 |
| 5,829,349 A | | 11/1998 | Fitzgerald et al. ......... 100/102 |
| 5,967,355 A | | 10/1999 | Ragot ................... 220/4.32 |
| 6,000,323 A | | 12/1999 | Schlegel .................. 100/35 |
| 6,367,377 B1 | | 4/2002 | Gawley et al. ............ 100/49 |
| 6,543,375 B1 | | 4/2003 | Sargent et al. ............ 114/45 |
| 6,626,093 B1 | | 9/2003 | Van Der Touw et al. ... 100/100 |
| 6,739,732 B1 | * | 5/2004 | Tseng .................... 362/183 |
| 6,863,827 B1 | * | 3/2005 | Saraceno ................. 210/748 |

FOREIGN PATENT DOCUMENTS

JP        2002015610 A  *  1/2002

* cited by examiner

*Primary Examiner*—Lowell A. Larson
*Assistant Examiner*—Jimmy T. Nguyen
(74) *Attorney, Agent, or Firm*—David D. Lowry; Thomas M. Saunders; Brown Rudnick Berlack Israels LLP

(57) ABSTRACT

A trash compactor designed for public use is powered by a photovoltaic cell array. This allows the trash compactor to be placed in locations where no power is available, but with frequent human traffic. The compaction feature allows the unit to be emptied less often than a typical trash container. The trash compactor can include a storage system to store power for compaction cycles. A removable bin allows easy removal of the compacted trash. The removable bin can include multiple chambers for different trash types.

11 Claims, 9 Drawing Sheets

SOLAR POWERED COMPACTION APPARATUS

RELATED APPLICATION

The present application claims the benefit of U.S. Provisional Application No. 60/476,832 filed on Jun. 9, 2003, which is incorporated herein by reference.

FIELD OF THE INVENTION

This invention is directed towards compactors for crushing trash or recyclables, and more particularly to an apparatus and method for solar-powered waste compaction.

BACKGROUND

Garbage cans and trash receptacles are important items at any location where there are people, to avoid the people having to carry trash with them or worse, simply littering. Many public areas such as outdoor recreation facilities provide trash cans at many locations, and most visitors are quite receptive to using such trash cans, provided that they are convenient and accessible.

However, trash cans often quickly fill up and require periodic emptying by maintenance personnel. Larger trash cans provide more capacity, but they still fill up and result in larger bulky unwieldy loads when they're emptied. For any size, trash cans that are remote are more difficult to empty, and require that personnel spend time and equipment traveling, emptying and hauling from the remote locations. Also, in urban locations and other high traffic areas, sanitation personnel must spend significant amounts of time and cost to remove trash and recyclables often several times daily, and urban areas often have space constraints on trash-bin size.

As is well known, typical trash is fairly bulky and is capable of being compacted down to smaller sizes. Most trash collection trucks utilize hydraulic compactors to increase their capacity.

Compaction on-site can save money and help to conserve fuel by reducing collection frequency, and thus vehicle travel time. Prior art trash and recyclables compactors characteristically require high-voltage, AC electricity, and are almost ubiquitously connected to the electricity grid. This limits the location of such trash compactors. Others have a fuel tank associated with them, such as with compaction mechanisms onboard garbage trucks or certain compactors that use diesel generators to provide power for compaction rams. These gas or diesel systems produce great noise and pollution as they operate. Thus, prior art trash compactors are characteristically confined to areas where electrical connections are feasible and cost-effective, or where there is a fossil fuel power source.

There is a need for powered compaction in remote settings and high-traffic areas, that will allow people to conveniently dispose of trash or recyclables, but allow much less frequent emptying service from maintenance personnel.

SUMMARY

The present invention uses the novel approach of using solar energy to compact trash and recyclables. Solar energy is a clean source of power, and also it enables compaction of waste in remote locations where other forms of power are impractical and uneconomical. Often, it is impractical and uneconomical to connect grid power to a compactor located even at a relatively close distance to an electricity source, for example, across a parking lot from a retail establishment.

This invention provides a low cost device and method for compacting trash and recyclables using stored photovoltaic energy. The device is formed to efficiently collect solar energy, efficiently store said energy and as needed, use the stored energy to compact trash or recyclables. The solar collector typically is a photovoltaic (PV) apparatus which is connected to a storage device, such as a battery, capacitor or fuel cell. Mechanical means of energy storage may include springs, pneumatic and hydraulic pressure. The apparatus uses stored energy to intermittently compact trash or recyclables. In another embodiment, the device supplies AC electricity to an AC-powered compaction mechanism by changing DC power from the PV array into AC electricity by means of an inverter. In a separate embodiment, the device supplies pressurized hydraulic fluid to a compaction ram that is actuated by hydraulic pressure.

In an illustrative embodiment, the electronics of the receptacle are enclosed in two compartments adjacent to the compaction area. This compartment is not accessible from the outside, to prevent tampering and/or user injury. Another feature to prevent user or operator injury is a battery disengage, which will prevent compaction-ram movement when either compartment door is open and will provide access to electronics or the compaction chamber. This works because the lock is coupled with a contactor switch, so whenever a door is open, the contactor switch is open as well. The battery and electronics compartments are also sealed from water to protect the enclosed electronics from the elements, and the battery compartment is vented separately from the electronics and motor compartments to allow for hydrogen gas to escape safely, as the flammable gas can be produced during charging of many types of batteries. The PV array is protected from weather and vandalism by a covering constructed typically of durable plastic and a metal grate. The battery is stored at the bottom of the compartment, in order to lower the center of gravity of the receptacle, and prevent tipping, while the hydrogen vent is located above the battery chamber to allow hydrogen gas to rise and escape the chamber without coming into contact with sparks from the motor or electronics compartments. At the bottom of this compartment is the motor, which is connected to the reduction gearbox and drive chains.

The waste insertion door is locked shut during a compaction cycle or is constructed to block from user intrusion into compaction chamber. This safety measure eliminates the possibility of a user being injured by the compaction ram. In the illustrative embodiment, this use lockout is passive and does not require energy to operate. Similar contraptions are seen on mailboxes, and prevent the user from access to the inner chamber of the device. Other safety measures include a locking mechanism on the access door to the waste bin to prohibit the general public from removing the waste. Only waste management personnel can access the waste chamber and electronics chamber. An access door is hingedly attached to allow the sanitation personnel to have unimpeded access to the waste bin.

Another embodiment can incorporate several compaction rams and/or compaction chambers, allowing for separation and compaction of different recyclable materials. It may also include mechanisms such as paper or plastic shredders, and bottle or can crushers, to more effectively reduce the volume of many materials. Since such an embodiment can be constructed to have multiple compaction chambers, the overall weight of each collection bin can be reduced, which will reduce worker injury associated with heavy loads.

Another embodiment of the present invention allows monitoring of the trash level in the compaction chamber. By monitoring the level of trash or recyclables in the chamber, a wireless communication mechanism can relay this information to the sanitation personnel so that unneeded visits are avoided. Communication may be relayed with a wireless transmitter or by a physical indicator, such as an indicator lamp. This further saves time and money by allowing the maintenance personnel to schedule collections according to demand.

Another embodiment of the present invention is constructed to be easily moved by virtue of a towing apparatus that enables many devices and/or compaction bins to be connected to each other, so that a single vehicle can tow many devices at once. This works much like luggage carts at the airport. This unique method of trash removal also helps to reduce worker injuries associated with carrying heavy loads.

Advantages of the present invention include a trash or recyclable collector which can be located in remote places that don't have access to AC power, and also require many fewer maintenance visits for emptying, while reducing litter.

Another advantage of the present invention is that it is optimized to work more often during times of most usage. Peoples' use of the device will occur most often during daylight hours, and therefore the unit has power from daylight as needed to perform compaction. Further, since more people are active outdoors during sunny days, the present invention is optimized to meet increased usage with increased compaction cycles.

Another advantage of the present invention is that the collection bins which handle dense, heavy waste, are positioned on a wheeled cart, reducing heavy lifting by sanitation personnel. Since waste is packed into two or more compartments, each load is made lighter, further reducing the strain for workers of lifting loads.

Another advantage of the present invention is that the system is animal-proof, for everything from insects to bears. Access to the contents is blocked by doors and circuitous paths. Odor which is objectionable and which also can attract critters is reduced by the design.

Another advantage of the present invention is that it allows bin capacity information to be relayed wirelessly, helping to avoid wasted trips and time. Real-time information provides an advantage over traditional reactionary scheduling methods. Real-time information will enable significant improvements in routing and scheduling techniques, and can be reduced to software to automate and optimize waste collection scheduling and routing decisions.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

The present invention is directed towards a waste collection receptacle with integrated solar compaction mechanism for public use. The generally rectangular metal unit has a solar panel on the top to attract maximum sunlight. The unit typically resembles waste receptacles currently in use, with respect to aesthetics, usage and size.

Figure 1:
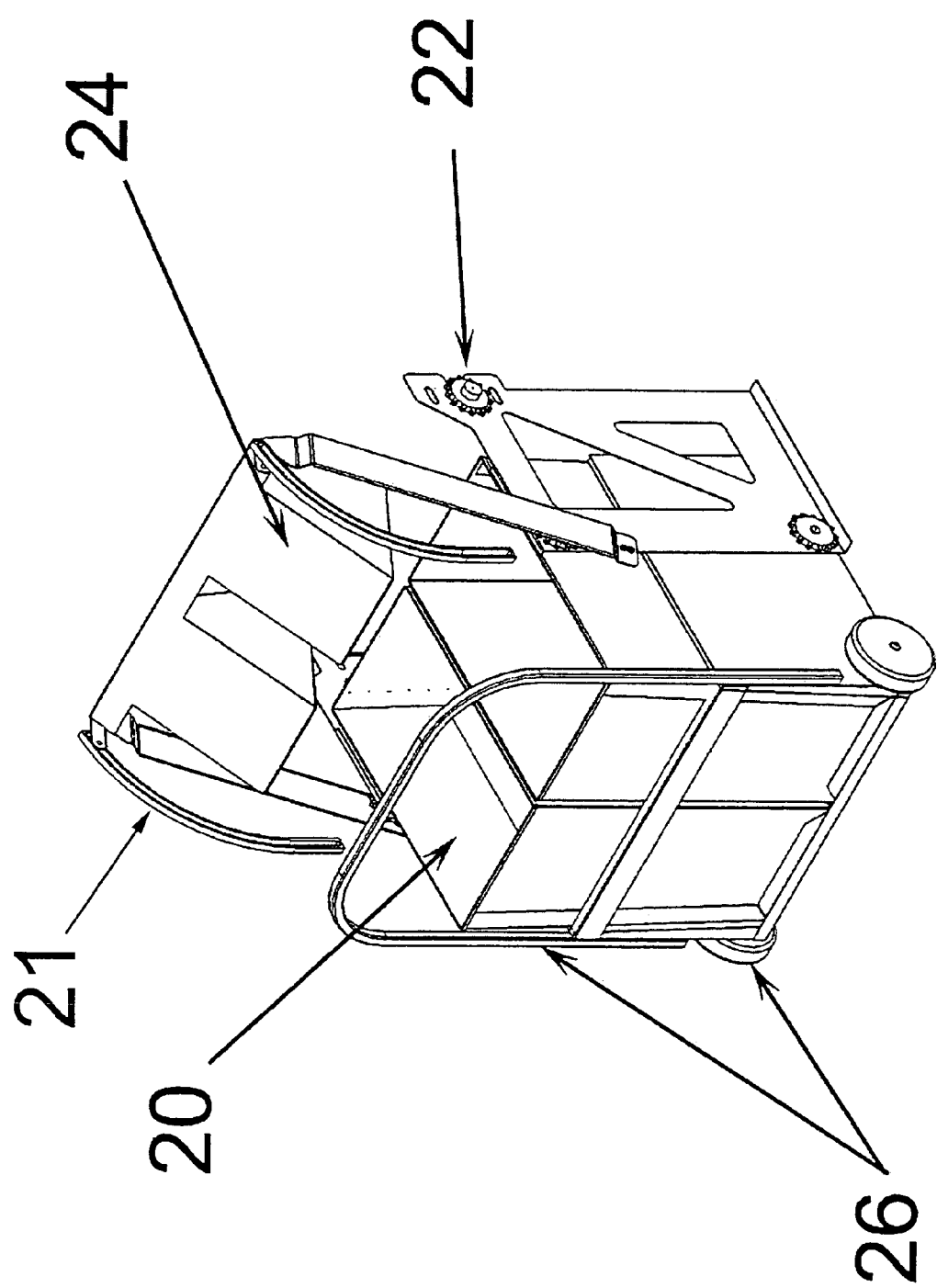
FIG. 1 illustrates a compaction ram and compaction chambers according to the present invention.

FIG. 1 provides a perspective view detailing the compacting ram 24, chain drive sprockets 22, ram guide track 21, and compaction chambers 20, showing the relationship between the compaction mechanism and the compaction chambers, according to the present invention. The compaction chambers 20 can include a handle and wheels 26 for easy removal.

Figure 2:
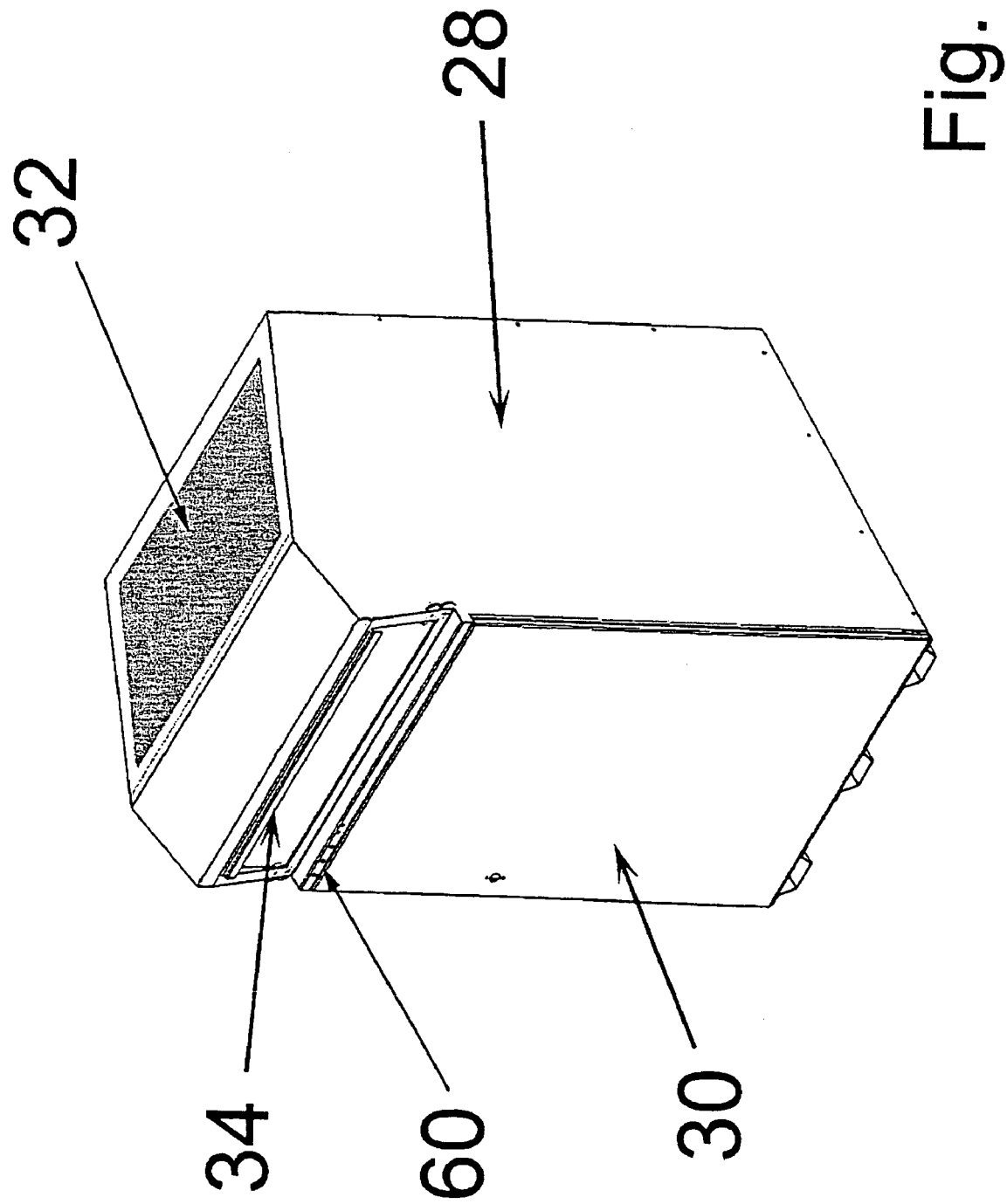
FIG. 2 shows an illustrative embodiment of the present invention.
Figure 6:
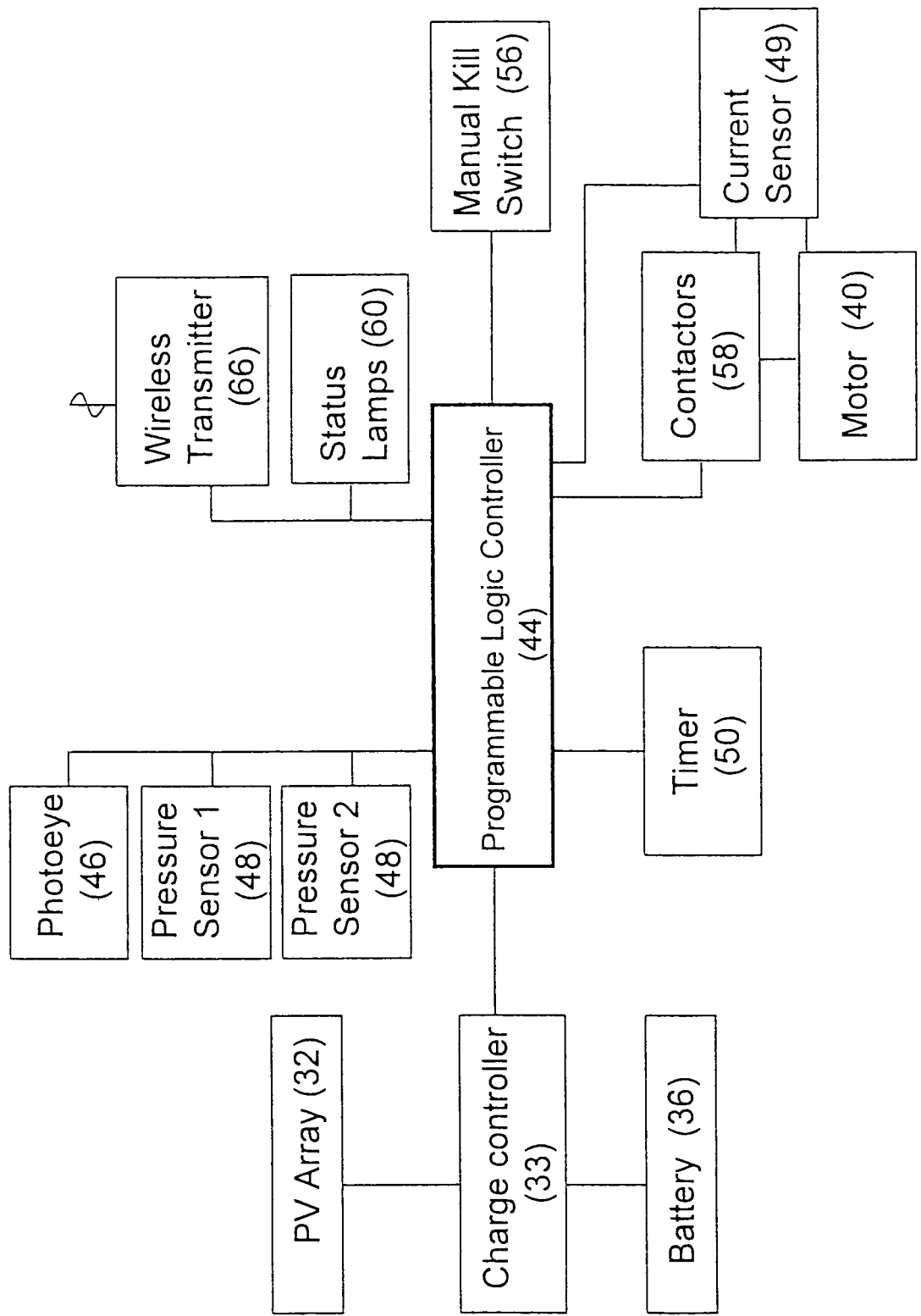
FIG. 6 is a block diagram of a control system for an illustrative embodiment.

A solar-compaction system according to the present invention is shown in FIG. 2, illustrating the orientation of the components of the outer container 28, as well as showing a position of a hinged waste removal door 30, and a trash insertion door 34. A photovoltaic (PV) cell array 32 is mounted on top of the unit, covering much of it. In one embodiment, cells 32 produce enough power for the average number of 15 compaction cycles per day, and the battery 36, shown in FIG. 4, has enough energy storage to provide for usage through weeks of intermittent sunlight. The cells are wired to the energy storage system, which stores power to drive the compaction. Status indicator lamps 60, FIGS. 2 and 6, provide visual means of displaying information such as a system malfunction or to indicate the level of bin capacity used and available. A trash insertion door 34 acts to prevent user injury because it locks out the user from the trash compaction area.

Figure 3:
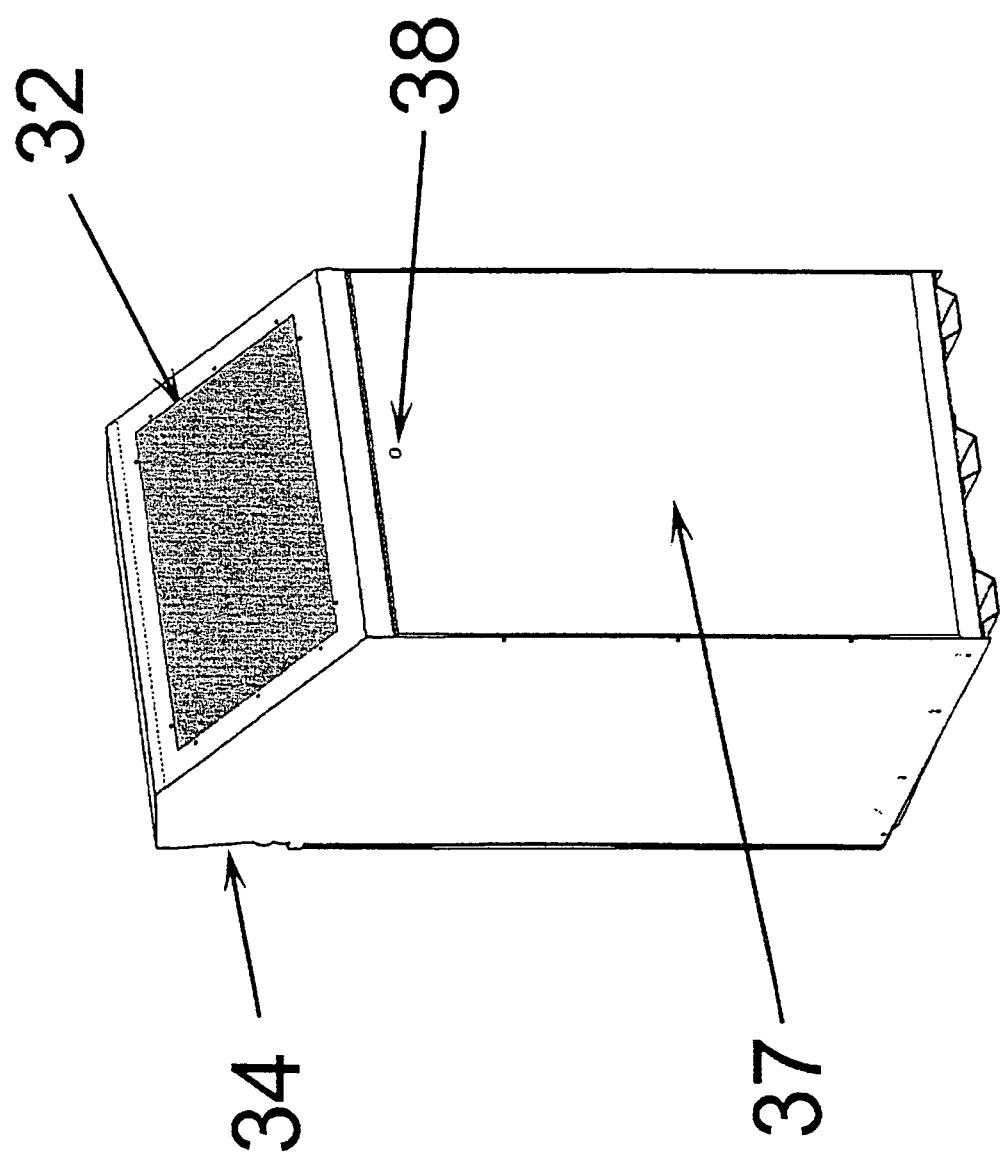
FIG. 3 is a perspective view of a second illustrative embodiment according to the present invention.
Figure 4:
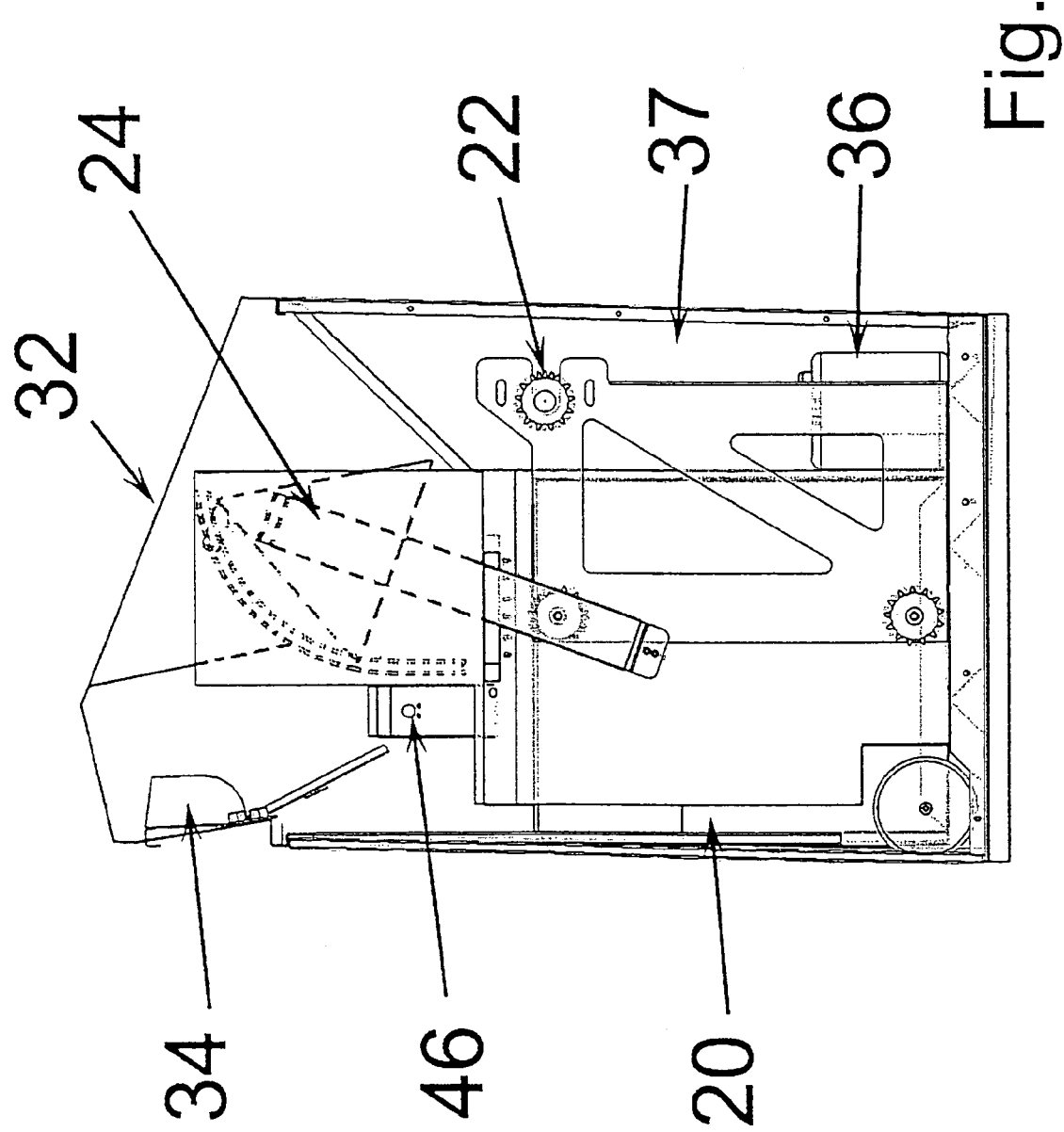
FIG. 4 is a side sectional view of the illustrative embodiment of FIG. 3.

More details are provided with the illustrative embodiment shown in FIGS. 3 and 4. The Photovoltaic (PV) array 32 is positioned on top of the device for maximum sunlight exposure. The PV array 32 may also be placed on other sides of the device to increase exposure to the sun when the sun is lower on the horizon. The PV array 32 may be optimally placed on an angle to prevent it from being covered by snow or debris. Further, the angle may be used to increase sunlight exposure based on azimuth of the sun across the sky. For example a PV array can be arranged to receive the most southern exposure during the day. Alternatively, the PV array 32 may be pivotally mounted and powered in order to rotate and track maximum sunlight exposure. Although the PV array 32 is shown attached to the unit, the PV array may also be separately located from the device and electrically connected. The PV array may alternatively be located inside the outer cover 28, and the outer cover may be constructed to allow sunlight into the protected area where the PV resides. The PV array may otherwise be mounted in a location on or outside the outer container accessible by light via a reflective surface such as a mirror, and inaccessible by vandals, negligent operators and animals.

The compaction ram 24 is shown in the resting position above the compaction chambers 20, FIG. 4. The illustrated embodiment includes a two sided ram to improve compaction capability and to facilitate removal by decreasing weight of each load, FIG. 5. The chain drive sprocket 22, upon rotating, drives chain 42 forward, driving the attached compaction ram 24 down, compacting the load. Alternatively the compaction ram 24 may move up or sideways, depending on the design of the system. The removable bin 20 includes a handle and wheels to roll smoothly in and out of the outer container 28.

The storage battery 36 is located preferably at a low point in the container to provide stability. The storage battery or batteries 36 can be upsized or downsized for different climates, compaction demands, or for or auxiliary functions, such as providing usable AC electricity through an inverter. The battery or batteries may also be stored separately from the container. The electronics compartments are preferably located in a weather-proof area 37 of the container. Electronic components can include a motor controller, battery charging controller, user interface, and sensors, as will be described below. The access door 38 to the electronics area 37 is key-lockable. When unlocked, the battery 36 will preferably be automatically disengaged.

Figure 5:
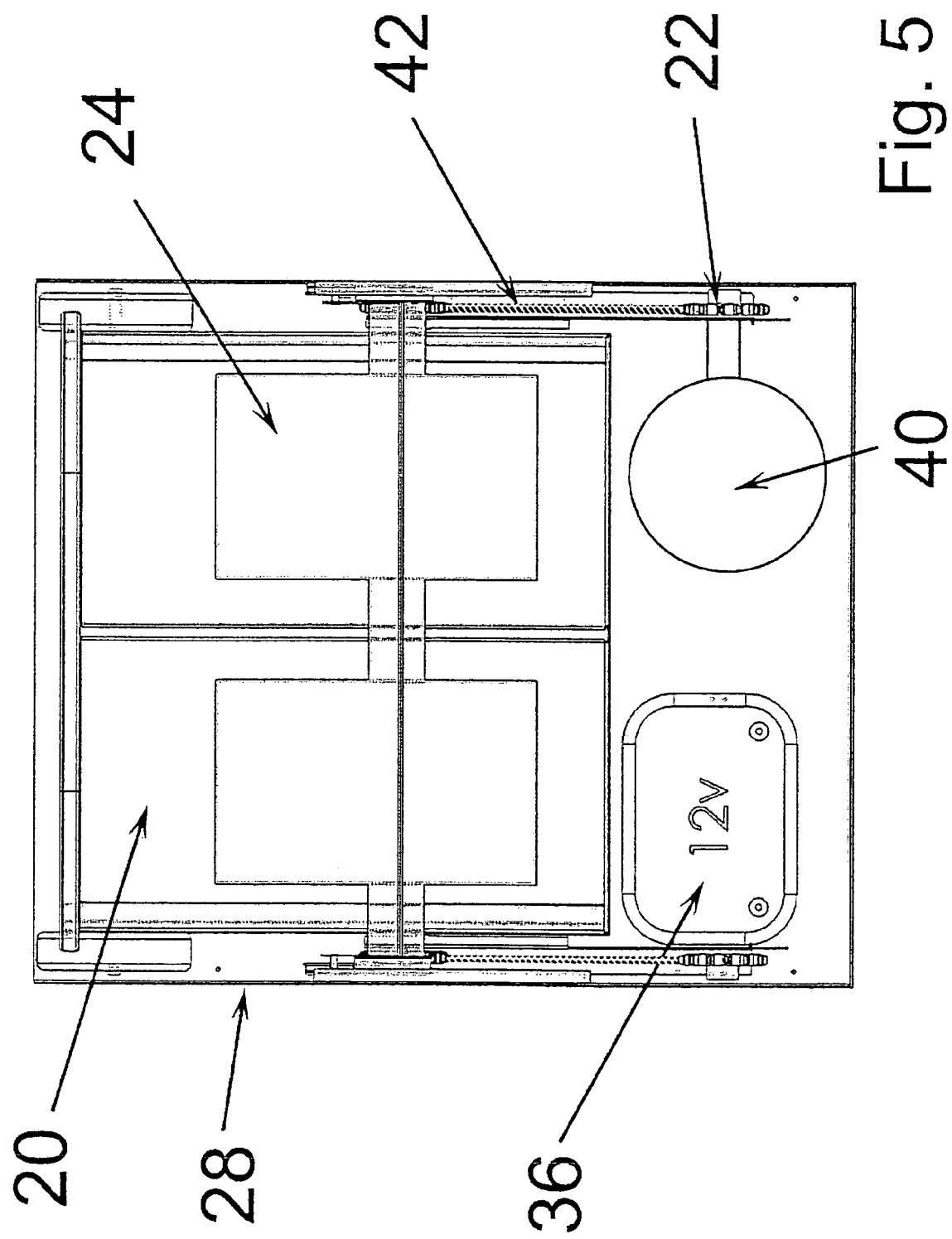
FIG. 5 is a top sectional view of the illustrative embodiment of FIG. 3.

In the illustrative embodiment, a deep cycle battery 36 is employed to drive a DC motor 40, FIG. 5. The motor 40 drives a chain 42, which rotates sprockets rigidly connected to the unit 22, and which transmits the crushing force to the compaction ram 24. Alternatively, the motor 40 may provide power to the chain drive 22 through a drive shaft and gears, including reduction gears, or one or more motors 40 may be directly attached to the chain drive 22, or the motor or motors may be connected via reduction gears to chains or lead screws, which control the position of the compaction ram. Alternatively, a hydraulic piston may be used to move the compaction ram. In this embodiment, the motor is used to drive a fluid pump, which supplies pressure to the hydraulic cylinders to move the ram.

A control apparatus for the illustrative embodiment is shown in FIG. 6. The motor controller 44 is a central microprocessor which manages all operations, detects all inputs and provides outputs for running the device. It controls power to the motor 40 by relays or contactors 58, FIG. 6 (mechanical or solid-state) or other switching means. A photo-eye 46 is located above the compaction chamber 20, FIG. 4, and is actuated when trash blocks the light rays between this photo-eye sensor and a reflector on the opposite side of the channel above the compaction chamber. The photo-eye signals the programmable logic controller (PLC) 44 when trash blocks the light beam for a measured amount of time, indicating that trash is located in the channel above the compaction chamber, and should be compacted. Other sensors may be used to detect the level of trash, including for example pressure sensors, micro switches, scales etc.

Pressure sensors 48, FIG. 6, are located above and below the compaction ram 24 and are actuated when the compaction ram has reached the end of its downward and then upward cycle. The sensors provide input to the motor controller PLC 44. The motor controller 44 can also receive input from the motor 40 that signals that the compaction ram 24 has reached the bottom of its downward cycle by means of a centrifugal switch on the motor 40 or a current sensor 49 in the motor controller 44 which detects motor current, or other type of sensor. When the motor 40 has reached the bottom of its cycle (or jams), it will stop due to the upward force on the ram from the compacted trash, or due to irregular forces that cause the ram to jam. At this point, the motor will stall, and a centrifugal switch sends a signal to the motor controller 44 to stop or reverse the direction of the motor 40, or the current sensor 49 (programmed current limit) linked to the motor controller 44 senses high current in the stalled motor, and will reverse the cycle, returning the compaction ram 24 to the top of its cycle. Otherwise, the motor 40 may be stopped by use of a manual kill switch 56, or activated by a manual actuator 57. In this illustrative embodiment, the current sensor is linked to a timer 50 through the PLC 44, which will allow the motor controller to gauge the travel distance of the compaction ram before motor stall, and thus measure the degree of "fullness" in the trash bins. In the illustrative embodiment, the maximum load is reached when the 12V motor reaches 40 Amps. If this current limit is reached within 10 seconds, then the controller will gauge that the compaction chamber is ½ full. If the current limit is reached within 5 seconds, then the controller will gauge that the compaction bin is full. Another method of indicating "fullness" is sensing ram travel with a rotational encoder located on the drive shaft. The PLC 44 senses conditions and then indicates status through a wireless data transmitter 66, and through status indicator lamps 60.

In this embodiment, the projected PV array output is 50 Watts Peak, and will generate, on average, 150 Watt-hours of energy per day, given an average of 3 hours of full sunlight available per day. Sunlight energy is collected in the PV Array 32, FIG. 6, and is converted by the charge controller 33, into a useful battery charging current and voltage. Battery reserve will be approximately 600 Watt-hours, and each cycle will use approximately 3 Watt-hours. Thus, the energy reserve in the illustrative embodiment is enough to run up to 200 compaction cycles. The controller will be programmed to permit compaction cycles such that battery over-discharge and thus battery damage is avoided. Since many electrical components are popular in 24 volt configurations and most PV arrays are available in 12 volt charging configurations, it may be economically advantageous to provide for 12 volt battery charging and 24 volt systems operations. This may be accomplished through the use of a relay and contactor switch, which will change the system voltage from 12 volts to 24 volts each time a compaction cycle is initiated.

Figure 8:
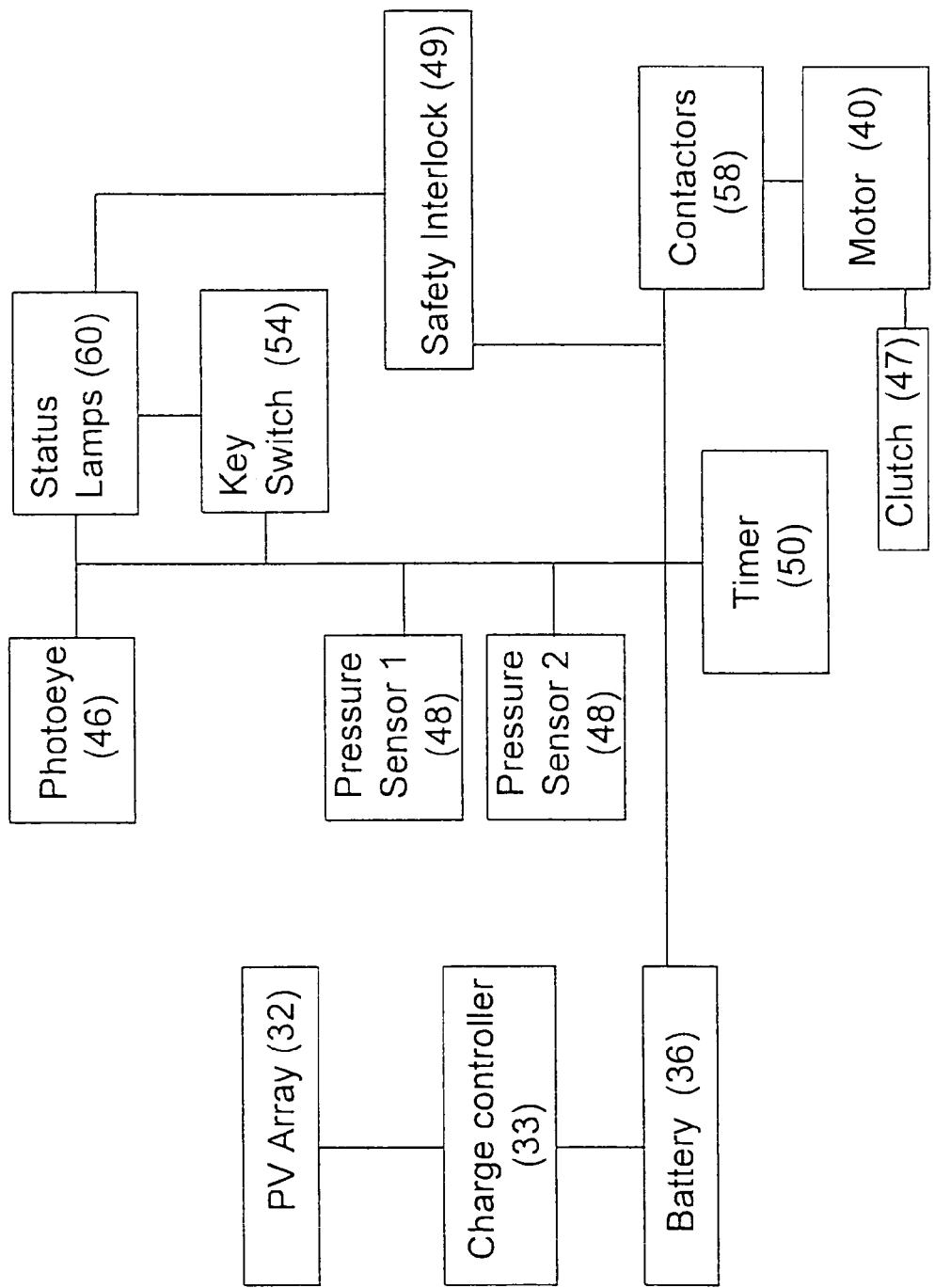
FIG. 8 is a schematic of electronics according to one embodiment.

In another embodiment which does not use an embedded microprocessor, the switching and control is performed using solid-state electronics, as shown in FIG. 8. The cycle is triggered by a "Start" signal, shown as a key switch 54, however other devices may be used, including a pushbutton, photoelectric sensor, weight sensor etc. When the cycle begins, the motor will turn on and latch into the "forward" (down) mode. A lamp will turn on, indicating that a cycle is taking place. If the bin is not full, the compaction ram will actuate the lower pressure sensor 48, which will then turn the status lamp 60 off. If the bin is full (pressure sensor or limit switch is not actuated), the lamp will remain on after machine cycle is done, alerting sanitation staff that collection is needed.

The motor will run in forward until either lower limit switch or pressure switch is reached, or until a timeout occurs. A timeout will occur if the amount of trash prevents the ram from reaching the bottom in the time allotted for a normal downward cycle. When the ram stalls, a clutch 47 will disengage the motor, allowing the motor to spin at no-load. Motor will spin at no-load until timeout occurs and motor is reversed. When motor reverses, clutch will automatically re-engage.

Upon hitting the lower limit switch or reaching a timeout, motor will stop for a preset time delay, then will reverse. The motor will run in reverse until the upper limit switch is actuated. When the upper limit switch 48 is reached, the motor stops and a new timer begins. A start signal will be ignored until this timer is finished. Once the cycle delay timer is done, the system is reset and ready for a new start signal.

The system includes a separate safety interlock switch 49 on the access door for emptying the bin. This switch disengages the power supply from all the control elements when the access door to the compaction area is open (this switch also resets the "bin full" lamp).

Figure 9:
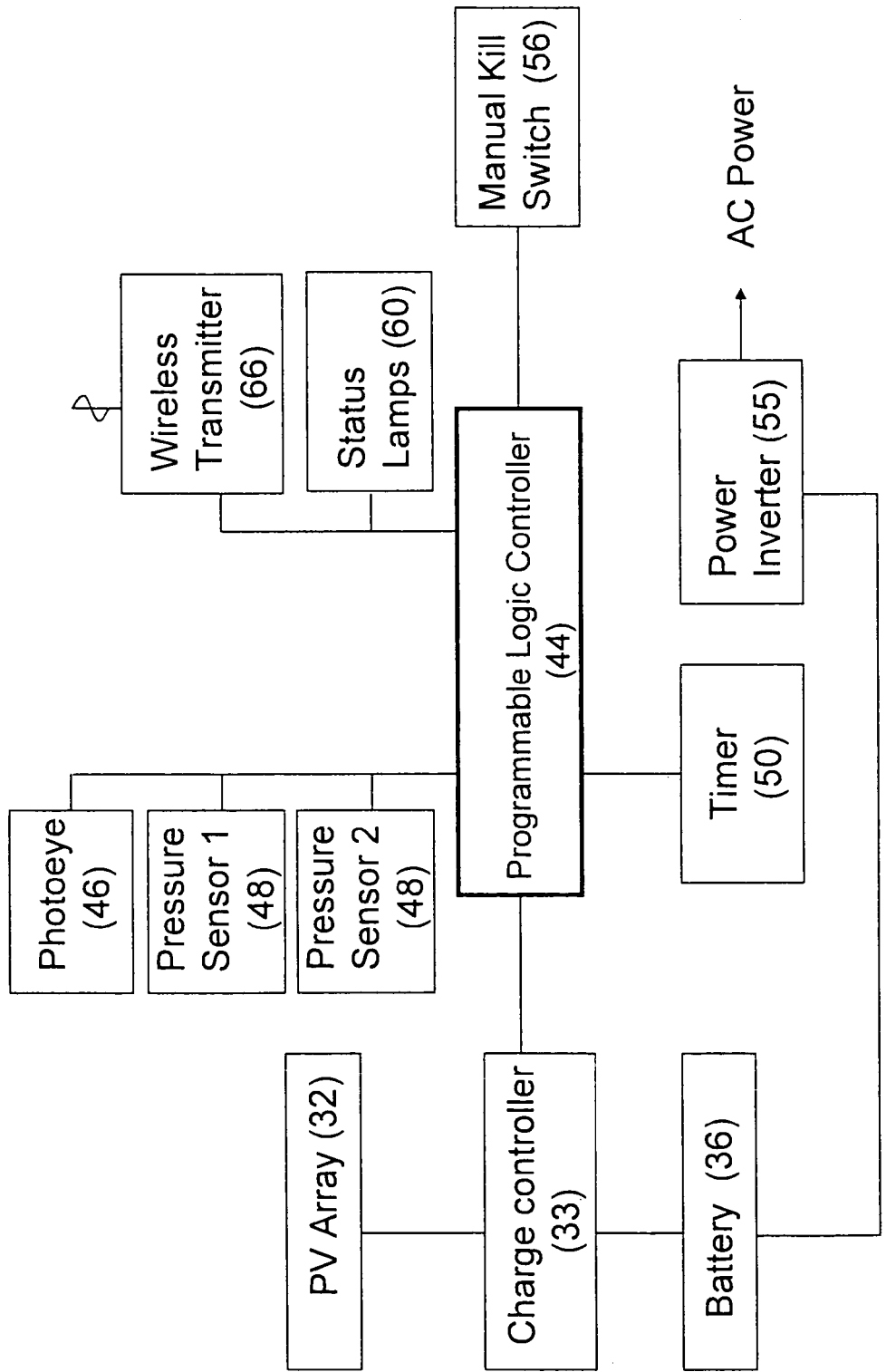
FIG. 9 is a schematic of an alternative control system providing AC power.

In another embodiment shown in FIG. 9, the motor controller 44 outputs AC power to an AC motor, allowing the same invention to power AC compaction mechanisms. The motor controller 44 includes a power inverter 55 (including either a pure sine wave or modified sine wave) to provide alternating current power for an AC motor. This is advantageous because many of the existing compactors in the field use AC power. Thus, the present invention, as shown in this embodiment, can power a traditional compactor with solar power and embedded control logic. Further, the present invention can include an electrical power outlet accessible from outside of the enclosure.

Figure 7:
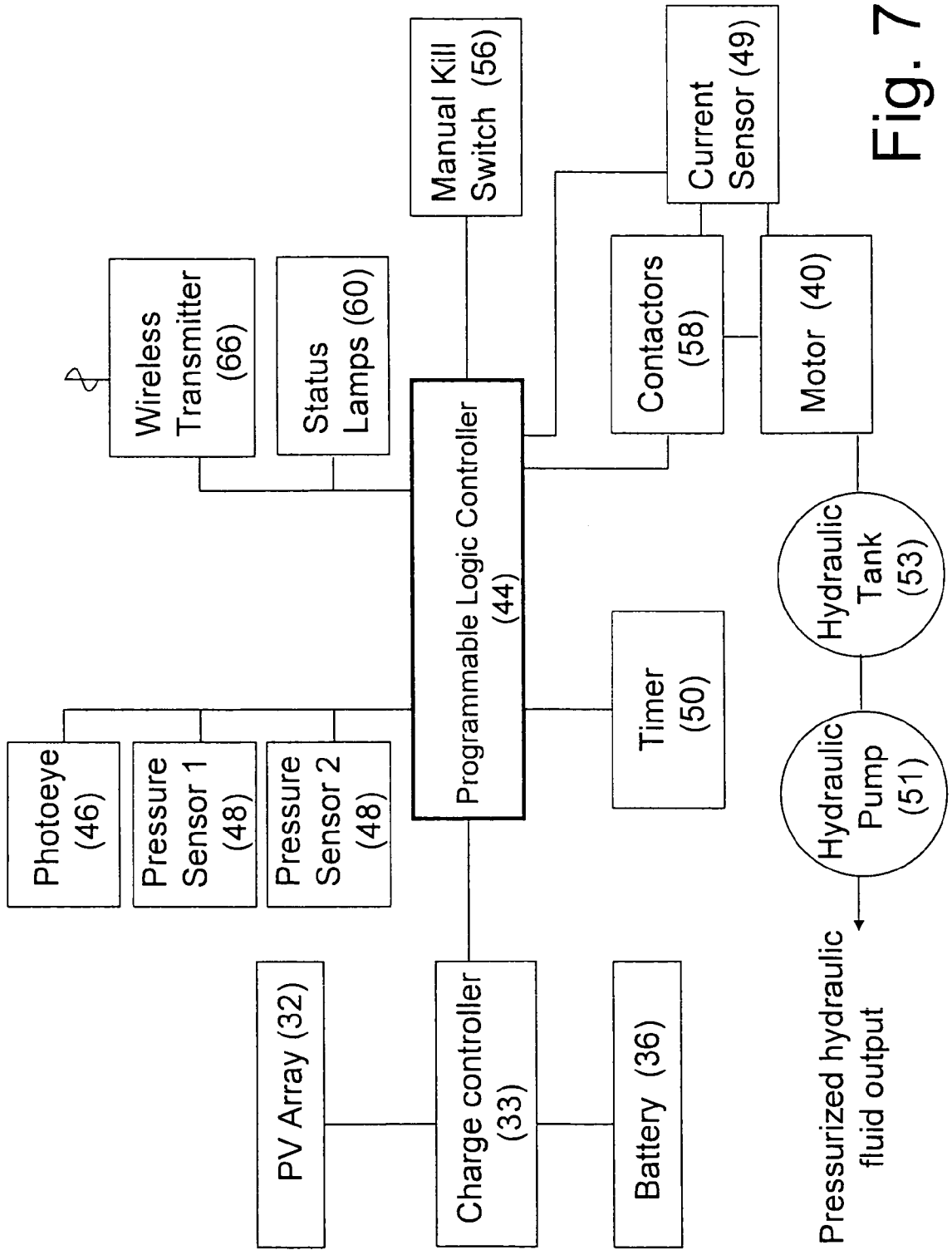
FIG. 7 is a block diagram of an alternative control system supplying hydraulic fluid.

Yet another embodiment of a controlling system is shown in FIG. 7. In this embodiment, the device uses a hydraulic pump 51 to pressurize hydraulic fluid from a tank 53, allowing the same invention to power a compaction mechanism that utilizes hydraulic fluid pressure cylinders to move the compaction ram. This is advantageous because many of the existing compactors are hydraulic, and require a hydraulic pump that is powered by AC electric power or internal combustion engine. The present invention, as shown in this embodiment, can power a traditional compactor with solar power and embedded control logic and a DC motor. This can save money and setup time, and allow compaction with various types of mechanisms to be used in remote locations not currently economically serviced by common electricity lines or with current compaction methods. Alternative systems may be used, and are within the scope of the present invention. For example, a pneumatic pump can be used to inflate a bladder inside the compaction chamber 20, thereby compacting the trash without requiring a compacting ram and chain drive system.

A feature of the illustrative embodiment is that the motor controller 44, when in charging mode, can act as a maximum power tracker, regulating the charging of the battery from the PV array. The power tracker has the ability to vary the level of voltage and amperage based on the characteristics of the PV array, the sunlight level and the battery condition. The power tracker has the ability to balance off current and voltage to optimize battery 36 charging. The motor controller 44 has the ability to optimize the charging regimen of the batteries 36, by tracking the level of photovoltaic energy available and the battery charge. When the battery 36 is fully discharged, the controller 44 will provide low voltage and high amperage. When the battery 36 is almost completely charged, the controller 44 will provide a higher voltage and lower current. When the battery is fully charged, the controller will not provide any charge to the battery 36, or will simply provide a trickle charge. Conversely, when the battery 36 is undercharged, the controller 44 may delay or skip a compaction cycle until adequate charge has been attained. This serves to save battery life and prevent failure. Because of the ability for the controller 44 to optimize charging regimen and control the motor, it serves a dual purpose.

Typically the duty cycle of the compaction apparatus is higher during peak traffic hours. For example, during lunch time, there will be more waste discarded into the device. This duty cycle can be controlled by a timer, or by a photo-eye as described above. The preferred method is to use the photo-eye because it will optimize compaction cycle to meet the demand for compaction. This allows for maximum charge time between needed compactions, and minimizes noise (if any) and down time due to the compaction cycle. This duty cycle is typically determined by low power timing circuitry contained in the receptacle. It is modifiable on the unit, or is programmable by means of a wireless communication device or by electrical connection between the programming device (i.e. computer) and the PLC 44. The motor controller 44 can also include data logging features, to allow compaction cycle history to be stored for later analysis.

A battery disconnect is attached to one or both of the battery supply cables. When either the trash bin removal door or the electronics door is opened, the battery is automatically disconnected, to prevent injury.

Table 1 provides specifications for a prototype system in accordance with one embodiment of the present invention.

TABLE 1

| Physical Specs of Unit | | |
|---|---:|---|
| Size of Ram | | |
| Width | 8.00 | Inches |
| Length | 12.50 | Inches |
| Number of Rams | 2 | |
| Weight | 20.00 | Pounds |
| Size of Compartment | | |
| Height of bin | 24.00 | inches |
| Length of bin | 19.50 | inches |
| Width of bin | 10.50 | inches |
| plunge of ram | 8.00 | inches |
| height of ram | 10.00 | inches |
| Volume of Bin | 42.54 | gallons |
| Volume available after compaction | 15.79 | gallons |
| Worst case volume after compaction | 7.89 | gallons |
| Compaction ratio | 4:1 | |
| Volume of raw trash collected | 107.17 | gallons |
| Best Case number of compactions | 8.08 | per fill |
| Worst case number of compactions | 16.17 | per fill |
| Desired Pressure | | |
| Chain Drive | | |
| Diameter of Drive Sprocket | 3.00 | inches |
| Length of Ram/Chain Travel | 18.00 | inches |
| Compaction Time | 30.00 | seconds |
| Desired Pressure | 10.00 | PSI |
| Compacting Force | 2000.00 | pounds |
| Motor Specs | | |
| Horsepower | 0.50 | HP |
| RPM | 1800.00 | RPM |
| Voltage | 12.00 | volts |
| Max Amps | 39.00 | amps |
| Power Numbers | | |
| RPM at Chain drive | 8.00 | RPM |
| Torque | 3983 | HP |
| Cycle Time | 30 | Seconds |
| Power Consumption | | |
| Losses | | |
| Drive Mechanism | 80.00 | percent |
| Chain Drive | 80.00 | percent |
| Energy Consumption per compact | | |
| Energy of compaction stroke | 1.41 | W * hrs |
| Energy of retraction stroke | 0.94 | W * hrs |
| Energy Needed per cycle | 2.35 | W * hrs |
| Energy Needed per cycle w/losses | 3.36 | W * hrs |
| Compactions Needed | | |

TABLE 1-continued

| | | |
|---|---|---|
| Compactions per day in High Volume Use | 12.13 | |
| Energy Used per day | 40.77 | W * hr |
| Battery | | |
| Voltage | 12.00 | Volts |
| Amp * hours | 55.00 | Ah |
| Watt * hours | 660.00 | W * hr |
| Average Temperature (Min) | 14.00 | Deg F. |
| Efficiency Due to Temp (round trip) | 60.00 | Percent |
| Actual Energy per battery | 396.00 | W * hr |
| Days of Compacting w/o charge | 9.71 | Days |
| Days to completely recharge | 10.30 | Days |
| Photovoltaic | | |
| Number of Cells | 35.00 | Cells |
| Area of PV | 560.00 | Square Inches (4" × 4" cell) |
| PV Specs | | |
| Energy from Sun | 0.66 | W/in^2 |
| PV efficiency | 15.00 | Percent efficient (14–22%) |
| Peak wattage of PV | 55.44 | Peak watts |
| Power from Cell | 0.10 | W/in^2 |
| Capacity factor (avg sun) | 70.00 | percent |
| Hours at avg capacity | 3.00 | hours |
| Energy Collected per day | 116.42 | W * hr |
| Adjusted available energy | 52.39 | W * hr |

The container may include drainage holes near the bottom to allow liquids in the trash to drain from the unit, to allow increased compaction of the remaining trash. An additional feature for cold weather locations includes a heating element to warm up the trash, thereby thawing any frozen liquids to allow them to drain. Further, many materials such as plastic are easier to compress at a higher temperature, so by heating the contents to the present invention can increase compaction efficiency. The heating element may be controlled so that it is only activated when the battery 36 is near full charge. Further, heating elements may be placed above, beneath or within the PV array, in order to melt snow or ice that is covering the PV array. In warmer climates, a shallow drainage basin may be used to facilitate evaporation of liquids. Sensors can detect moisture, temperature, or a lack of light reaching the PV array and activate the snow melting heating elements, or may initiate fans to evaporate liquids in the drainage basin.

Another embodiment of the present invention includes using two or more similar bins for trash storage, for the purpose of separating recyclable materials and to reduce the weight and volume of each bin, reducing the chance of worker injury, and enabling the use of smaller, more standardized garbage bags.

The container may include mounting clips on the exterior to allow advertisement placards to be placed on the outside of the containers. Other features include wired or wireless communications equipment installed with the container. Radio signals may be transmitted by the container when it is full and no more compaction is possible, or if the unit is broken or being vandalized. Further, the container can report on conditions including battery charge, cycle counts etc. The container can also receive signals, including commands to immediately perform compaction cycles or to change cycle timing, etc. The containers may also report conditions by indicator lights which may indicate if the unit is full or malfunctioning. Such indicator lights allow the containers to be inspected from a distance (such as through binoculars) to allow service personnel to determine whether it is necessary to make a service trip to the container.

It is possible to have two or more containers for trash storage, for the purpose of separating recyclable materials and to reduce the weight and volume of each bin, reducing the chance of worker injury, and enabling the use of smaller, more standardized garbage bags. The containers may have separate access ports to allow people to sort and place different types of items into different containers. For example, one container could have paper products while others have cans. Such a device according to the present invention could then compact the contents each internal container separately (using individual compaction rams or one compaction ram which the containers are mechanically shifted to), or all at once using one large compaction ram 24 that spans all the containers. Alternatively, each container may have various types of crushers or shredders suited for each type of material. If different compaction rams are used for each internal container, then the device could compact only the containers that were full. Further, since different materials have different compacting characteristics (for example, crumpled paper compresses much easier than metal cans), the compacting mechanism size, shape, force, method and cycle duration can be optimized for a particular type of material.

Although solar power is disclosed as a source of power for the present invention, other sources of power are within the scope of the invention. This includes windmill or waterwheel generators located proximate the container, or located at an optimal location for collecting power. Alternatively, a generator with a hand or foot crank may be positioned with the container, with instructions inviting users of the trash container to crank the handle or pedal several times to help store energy to compact their trash. For such generators, whether by windmill, waterwheel or human, alternative energy generation means and energy storage means may be used, for example pumping air into a pressure tank for driving a pneumatic motor, winding up a spring mechanism, or a pulley system to raise a very heavy compaction ram, which then compacts the trash by its own weight.

Although the invention has been shown and described with respect to illustrative embodiments thereof, various other changes, omissions and additions in the form and detail thereof may be made therein without departing from the spirit and scope of the invention.

What is claimed is:

1. A storage container comprising:
   an enclosure;
   a photovoltaic panel located on an upper exterior surface of said enclosure, said photovoltaic panel positioned to be exposed to sunlight, to convert said received sunlight into electric power;
   a storage battery, located within said enclosure and electrically connected to said photovoltaic panel;
   a controlling component, electrically connected to said storage battery, said controlling component to monitor and control compactions performed by said storage container, wherein said controlling component will skip a compaction cycle when said storage battery is undercharged until an adequate charge has been attained;
   a compaction ram, located within said enclosure, said compaction ram positioned to travel along a preset path within said enclosure;
   a driving mechanism located within said enclosure and electrically connected to said controlling component, wherein said driving mechanism is coupled to said compaction ram, said driving mechanism to use electric power from said storage battery to move said compaction ram along said preset path within said enclosure; and an access door, located on said enclosure, said access door to allow user access within said enclosure;

wherein items introduced into said enclosure by said access door settle into a removable bin, and wherein when said compaction ram travels along said preset path within said enclosure, said compaction ram compresses said items within said removable bin, and said compaction ram travels within at least a part of said removable bin.

2. The storage container of claim 1, wherein said compaction ram is outside of said removable bin at one end of said preset path.

3. The storage container of claim 1 wherein said removable bin includes wheels attached at a lower portion.

4. The storage container of claim 1 wherein said driving mechanism is disabled when said access door is open.

5. The storage container of claim 1 further including:
a signaling mechanism, to provide an indication that said enclosure is substantially full of items.

6. The storage container of claim 1 further including:
a signaling mechanism, to provide an indication that said enclosure is failing to operate properly.

7. The storage container of claim 1 wherein said removable bin includes multiple chambers.

8. The storage container of claim 7 wherein said compaction ram travels simultaneously within all of said multiple chambers.

9. A solar powered trash compactor comprising:
an enclosure;
a photovoltaic panel located on an angled upper exterior surface of said enclosure, said photovoltaic panel positioned to be exposed to sunlight, to convert said received sunlight into electric power;
a storage battery, located within said enclosure and electrically connected to said photovoltaic panel;
a controlling component, electrically connected to said storage battery, to monitor and control compactions, wherein said controlling component will skip a compaction cycle when said storage battery is undercharged until an adequate charge has been attained;
an electric motor located within said enclosure and electrically connected to said controlling component, said electric motor connected to a chain drive mechanism, said chain drive mechanism also connected to a compaction ram, wherein said compaction ram, when moved by said chain drive mechanism, moves along a preset path within said enclosure;
a removable bin, located within said enclosure, wherein items introduced into said enclosure by an access door settle into said removable bin, said removable bin positioned within said enclosure so that when said compaction ram travels along said preset path within said enclosure, said compaction ram travels within at least a part of said removable bin and compresses items within said removable bin; and
a removable bin access door, located on said enclosure, to allow insertion and removal of said removable bin from said enclosure.

10. The storage container of claim 1, wherein said controlling component receives signals from a photoelectric sensor, providing an indication that said removable bin is full of items.

11. The solar trash compactor of claim 9, wherein said controlling component receives signals from a photoelectric sensor, providing an indication that said removable bin is full of items.

* * * * *